April 21, 1953 N. R. RICHMOND ET AL 2,635,699
PROPELLER CONTROL MEANS
Original Filed Dec. 9, 1941 5 Sheets-Sheet 4

Fig.3

INVENTOR
NELSON R. RICHMOND AND DONALD W. PERIN, DECEASED,
BY MAURICE J. LEVY, ADMINISTRATOR
BY
Harris G. Luther
ATTORNEY

Patented Apr. 21, 1953

2,635,699

UNITED STATES PATENT OFFICE 2,635,699

PROPELLER CONTROL MEANS

Nelson R. Richmond, Thompsonville, Conn., and Donald W. Perin, deceased, late of Greenfield, Mass., by Maurice J. Levy, administrator, Greenfield, Mass., assignors to United Aircraft Corporation, East Hartford, Conn., a corporation of Delaware Continuation of application Serial No. 664,640, April 24, 1946, which is a continuation of application Serial No. 422,252, December 9, 1941. This application February 21, 1949, Serial No. 77,644

27 Claims. (Cl. 170—160.2)

This application is a continuation of U. S. application Serial No. 664,640, filed April 24, 1946, by Donald W. Perin and Nelson R. Richmond for Propeller Control Means which is a continuation of U. S. application Serial No. 422,252, filed December 9, 1941, by Donald W. Perin and Nelson R. Richmond for Propeller Control Means, both of which applications are now abandoned.

This invention relates to improvements in controllable-pitch propellers and has particular reference to an improved control for a hydraulically actuated constant-speed feathering propeller.

An object of the invention resides in the provision of a more accurate and sensitive control means for a propeller and one which is not subject to overshooting or hunting when acting under constant-speed operation.

A further object resides in the provision of an improved control means which may be subjected to either manual or automatic operation at the will of the operator.

A still further object resides in the provision of a propeller control means which does not require a hydraulic connection between the speed responsive governor and the pitch changing mechanism of the propeller.

An additional object resides in the provision of an improved control means having alternative governor controlled hydraulic means and manually controllable electric means for changing the pitch of the propeller.

Other objects and advantages will be more particularly pointed out hereinafter or will become apparent as the description proceeds.

Figure 1:
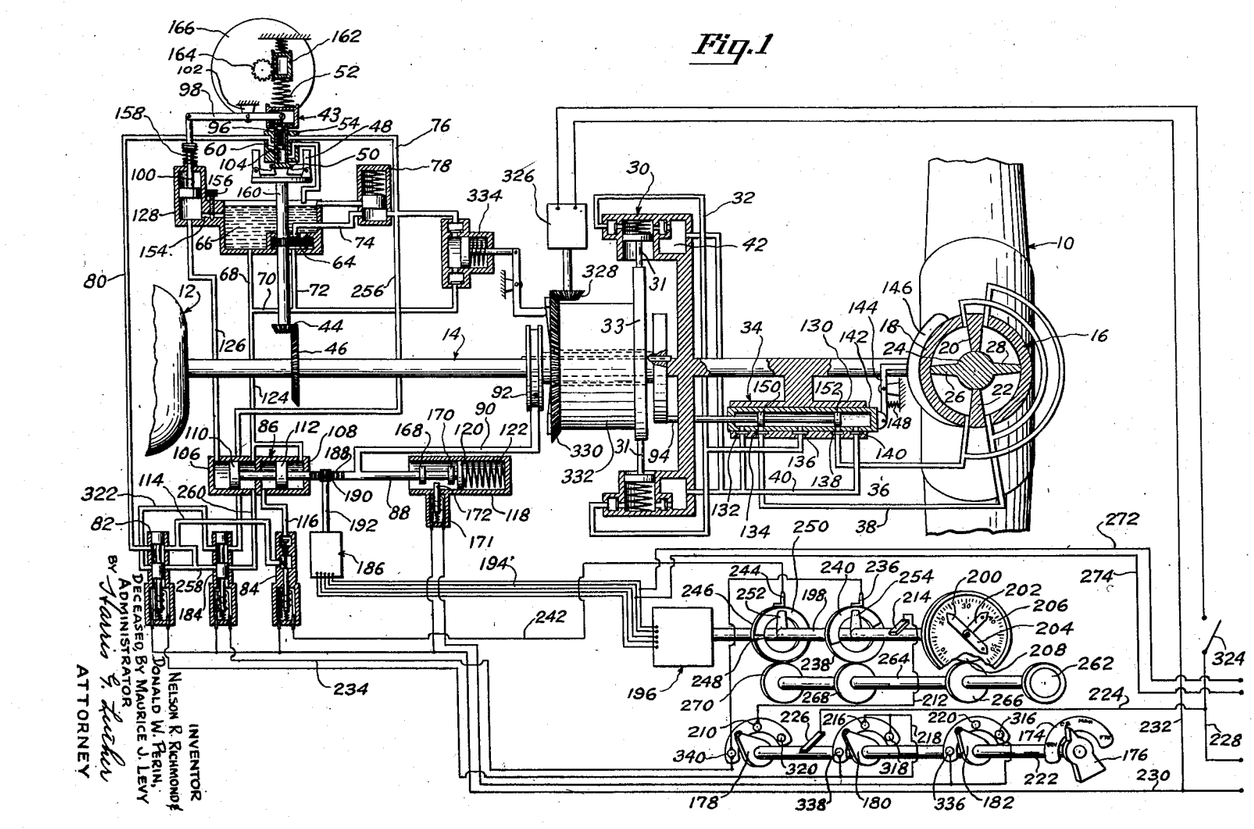
Fig. 1 is a diagrammatic view of the improved propeller pitch control means.

Referring to the drawings in detail and particularly to Fig. 1, the numeral 10 generally indicates a hydro-controllable feathering-type propeller having a hub 11 and the numeral 12 generally indicates the propeller driving engine from which projects the propeller drive shaft, generally indicated at 14. The propeller 10 is provided with suitable pitch changing apparatus such as hydraulic motors and, for the purpose of illustration, is shown as having an individual vane type for each blade, one of such motors being shown in section in Fig. 1 and generally indicated at 16. This motor has an outer relatively movable portion 18 provided with a pair of diametrically opposed vanes 20 and 22 and connected to the corresponding propeller blade and an inner relatively fixed member 24 provided with a pair of diametrically opposed vanes 26 and 28. Hydraulic fluid is supplied to the pitch changing motor or motors from a suitable source of hydraulic fluid under pressure, such as the pump generally indicated at 30, through the pressure conduit 32 leading to the distributing valve, generally indicated at 34, and from the distributing valve alternatively to the conduits 36 and 38 depending upon the setting of the distributing valve as positioned to determine the direction of propeller pitch change. When hydraulic fluid under pressure is supplied through one of the lines 36 or 38 to one side of the pitch changing motors, fluid will drain from the opposite side of the pitch changing motors, through the other line to the distributing valve 34 from which it will be conducted through the channel 40 to the sump or reservoir 42 connected with the intake side of the pump 30. The pump and sump are in the propeller hub, and the pump plungers 31 are reciprocated by stationary cam 33 during rotation of the propeller.

Figure 2:
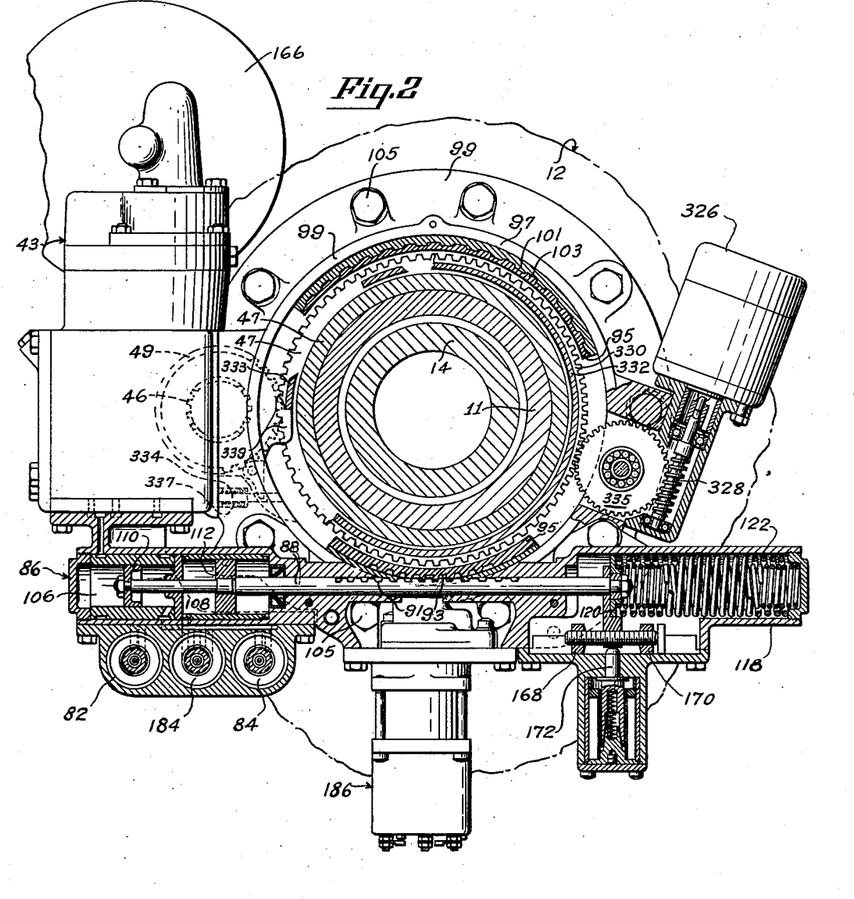
Fig. 2 is a transverse sectional view at the front end of the propeller driving engine taken along the lines 2—2 of Fig. 2A with the control housing shown in full and showing the arrangement of the major elements of the control apparatus around the front portion or nose piece of the engine.
Figure 2A:
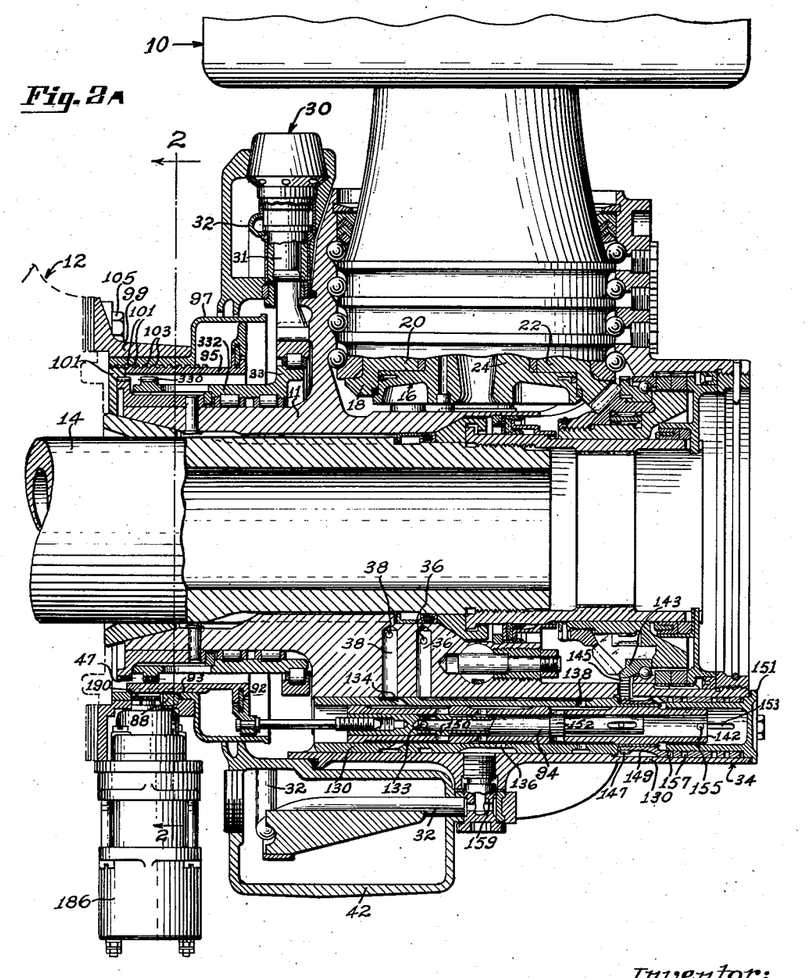
Fig. 2A is a longitudinal sectional view of the assembled propeller, engine and control section.
Figure 3:
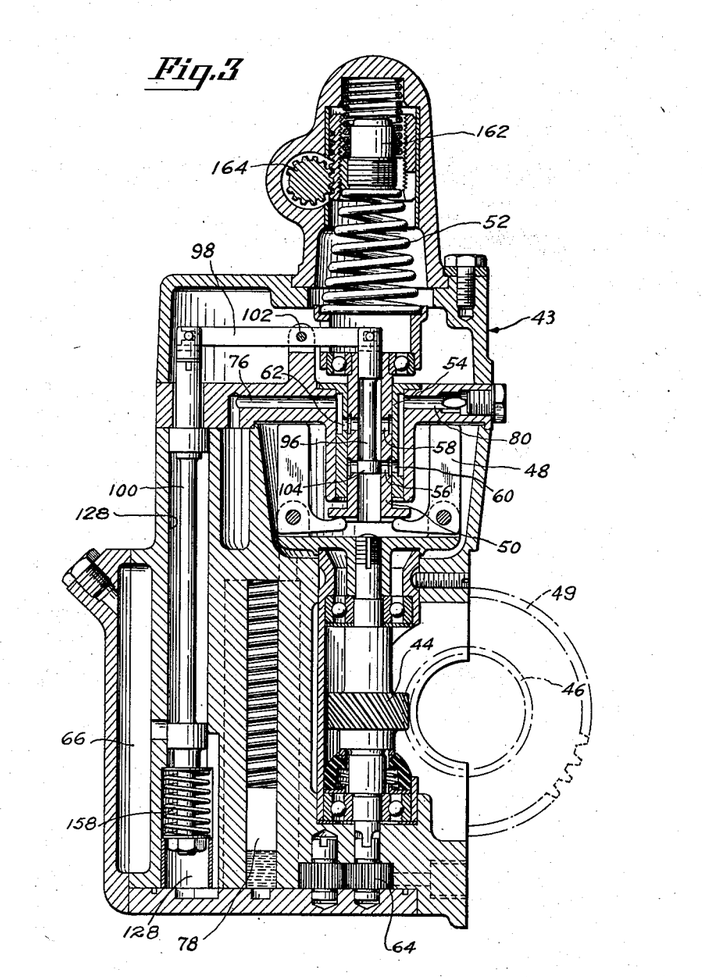
Fig. 3 is a longitudinal sectional view on an enlarged scale of a speed responsive governor constituting one of the elements of the improved control apparatus.

The distributing valve 34 is carried by the propeller 10 and is controlled by a speed responsive governor, generally indicated at 43 and particularly illustrated in Fig. 3, driven from the engine by suitable means such as the gears 44, 46, 47 and 49. The governor 43 includes a set of centrifugally actuated flyballs 48 which act against a slide valve 50 in opposition to a speeder spring 52. The slide valve rotates and reciprocates in a fixed valve cylinder 54 and is provided with ports 56 and 58 registerable with ports 60 and 62 in the fixed valve cylinder 54. A fluid pump 64, which may be driven by the governor drive gears 44, 46, 47 and 49 from the engine 12, receives hydraulic fluid from the reservoir 66 through the conduits 68, 70 and 72 and supplies this fluid under pressure through the conduits 74 and 76 and the pressure relief valve 78 to the valve cylinder port 62. From the valve cylinder port 60 a fluid pressure line 80 leads through the solenoid controlled valves 82 and 84 to the servo-motor, generally indicated at 86, which servo-motor operates a shaft 88 connected through the displacement mechanism 90 and rotational slip joint 92 with the plunger 94 of the pitch controlling distributing valve 34 so that the distributing valve will be positioned to change the pitch of the propeller in response to governor demands for increase or decrease in the speed of the power plant including the engine 12 and propeller 10. As shown in Figs. 2 and 2A, the displacement mechanism schematically shown at 90 in Fig. 1 comprises rack teeth 91 cut into shaft 88 and meshing with teeth 93 cut in a small portion of the circumference of sleeve 95 forming a portion of slip joint 92. Sleeve 95 is supported inside of an oil guard 97 which is secured to the control support 99 by any suitable means. Oil guard 97 has spiral teeth 101 cut in a portion of its inner circumference and sleeve 95 has mating spiral teeth 103 cut in a portion of its external circumference so that longitudinal movement of shaft 88 will cause rotation of sleeve 95 and the spiral teeth 101, 103 will cause longitudinal reciprocation of the sleeve and hence of the slip joint 92. Control support 99 is secured to the nose of the engine by means of cap screws 105.

Within the slide valve 50 there is a reciprocable pilot valve 96 projecting out of the open upper end of the slide valve and there pivotally connected to one end of a lever member 98 which is pivotally connected at its opposite end to the upper end of a compensating plunger 100 and supported intermediate its length on a fixed pivot 102. At its lower end the pilot valve 96 carries a piston 104 adapted to close off the port 56 when the pilot valve is in its neutral position. When the piston 104 of the pilot valve 96 is above the port 56 the fluid line 80 leading to the servo-motor will be connected with drain through the lower open end of the slide valve 50 and when this piston 104 is below the port 56 the pressure line 76 will be connected with the fluid line 80 to supply hydraulic fluid under pressure to the servo-motor.

The servo-motor 86 is arranged with two cylinders 106 and 108 in tandem and in each of these cylinders there is a reciprocable piston, as indicated at 110 and 112, respectively, both pistons being rigidly secured to the shaft 88. In the arrangement illustrated, the pressure line 80 leads to the valve 82 and a branched conduit 114 connects the outlet of this valve with the inlet of the valve 84 and the outlet of which is connected by a conduit 116 with the left hand end of the cylinder 108 so that fluid under pressure supplied to the line 80 and the valves 82 and 84 and conduits 114 and 116 will force the piston 112 to the right as viewed in Fig. 1. The shaft 88 extends into a cylindrical casing 118 and carries an abutment 120 within this casing which abutment bears against one end of a compression spring 122 the opposite end of which bears against the closed end of the casing. The spring 122 thus opposes the action of the fluid under pressure on the piston 112 and urges the shaft 88 towards the left as viewed in Fig. 1.

The right hand end of both cylinders 106 and 108 are connected by an exhaust duct 124 with the sump 66 so that any fluid trapped in these ends of the tandem cylinders can be vented to the sump and will not interfere with the operation of the pistons 110 and 112. The left hand end of the cylinder 106 is connected by the fluid line 126 with the bottom of the cylinder 128 within which the compensating plunger 100 reciprocates. With this arrangement the piston 104 of the pilot valve is moved to close the port 56 as the servo-motor shaft 88, which adjusts the valve 34, approaches a position corresponding to a governor speed change demand and thus gradually retards the rate of movement of the servo-motor as the propeller pitch approaches an angle corresponding to the speed change demand of the governor. It should be noted that the hydraulic system for the governor and its servo-motor and the separate hydraulic system for the propeller are both separate from and independent of any lubricating system that may be used in the engine. It is thus possible to use a fluid best suited to the governor or the propeller without the limitation that that fluid shall also be suitable for lubricating an engine.

The distributing valve 34 has an outer cylindrical casing 130 provided with ports 132, 134, 136, 138 and 140 within which is a reciprocable sleeve member 142 operatively connected at one end with the propeller pitch changing mechanism by a suitable mechanical connection schematically shown in Fig. 1 as a bell crank lever 144 and a cam 146, the bell crank lever being maintained in contact with the cam by a suitable compression spring 148. In Fig. 2A the ports 132 and 140 of Fig. 1 are represented by the open right hand end of the sleeve 142 and a hole through the interior of plunger 94 and a hole 133 through the side of the plunger. The connection between the sleeve member 142 and the propeller pitch changing mechanism is represented by gears 143, 145 and 147, rotatable spiral cam 149, stationary member 151, slotted at 153 and by pin 155 passing through sleeve 142, slot 153 and cam slots 157 of spiral cam 149. For a more complete description, reference may be made to application Ser. No. 686,298, now Patent No. 2,462,932, filed by John E. Anderson for Pitch Changing Mechanisms. The valve plunger 94 projects into the sleeve 142 and is provided therein with spaced valve pistons 150 and 152. The valve ports 132 and 140 are connected through the drain channel 40 with the sump 42 at the inlet side of the pump 30. In Fig. 2A, the interior of hub 11, which receives oil discharged from the open end of sleeve 142, is connected with the sump 42 through a hollow screw similar to screw 159 connecting conduit 32 with port 136. The port 134 is connected by the fluid channel 38 with one side of the hydraulic motor 16. The port 138 is connected by the fluid channel 36 with the opposite side of the hydraulic motor and the port 136 located at the mid-length position of the distributor valve is connected by the fluid pressure line 32 with the outlet of the pump 30 so that fluid under pressure is applied at all times to this intermediately positioned port. The valve sleeve 142 is provided with ports which are registerably respectively with the ports in the outer fixed casing 130 over a predetermined range of relative movements between the sleeve and the casing.

The operation of this distributing valve is such that when the plunger 94 is moved in response to a governor demand for a speed change, one side of the hydraulic motor will be connected with the fluid under pressure while the other side will be connected with the sump and the motor will act to change the propeller pitch. However, as the propeller pitch is changed the sleeve 142 will be moved to close off the connections between the distributing valve and the propeller pitch changing motor at a rate such that when the propeller pitch has been changed a number of degrees sufficient to correct the governor indicated deviation from the speed for which the governor is set, the pitch changing motor will be stopped and locked against any further pitch change until the governor again changes the position of the plunger 94. Thus, the position of the plunger 94 is at all times indicative of the pitch angle of the propeller blades.

The cylinder 128 is provided with a bleed vent 154 controlled by a needle valve 156 the purpose of which is to permit the pilot valve to return to its neutral or centered position blocking the port 56 in the normal position of the valve 50 under the influence of the centering spring 158 as the governor 43 returns to its usual or "on-speed" position with the propeller pitch at the angle required to maintain the power plant at the speed for which the governor is set, the "on-speed" position of the governor being that in which the flyweights 48 are substantially parallel to the axis of the governor drive shaft 160.

The speed setting of the governor may be varied by suitable means such as the movable abutment 162 disposed at the upper end of the speeder spring 52 and moved by the rotatable pinion 164 the teeth of which mesh with suitable rack teeth provided in one side of the abutment, movement of the abutment by rotation of the pinion changing the loading on the speeder spring in a manner to change the speed setting of the governor. The pinion may be rotated by manual or automatic means such, for example, as the cable pulley 166 which may be connected by suitable cables with a manual control device, not illustrated.

The above-described mechanism will provide an automatic constant-speed control of the power plant over a predetermined range of propeller pitch angles, the range of pitch angles being determined by suitable means such as the limit stop 168 and 170 mounted on shaft 88 and cooperating with an electro-magnetically controlled plunger 172 which may be retracted out of contact with the limit stops for feathering or reverse operations of the propeller as will be presently described.

The control has four different modes of operation as indicated on the dial 174 of the selector 176. These are, reading clockwise of the dial "reverse," "constant speed," "manual control" and "feathering."

In Fig. 1 the selector is illustrated as set for constant-speed operation as described above. With the selector knob 176 in the "constant speed" position, the switch arms 178, 180 and 182 are all on dead contact points so that the solenoids of all of the solenoid valves 82, 84 and 184 and the solenoid 171 controlling the plunger 172 are de-energized permitting the respective projecting springs to move the various valves and the limit stop plunger to the positions illustrated. One unit 186 of an "Autosyn" system is operatively connected with the shaft 88 by suitable means such as the rack teeth 188 on the shaft and a pinion 190 on the unit drive shaft 192. This unit 186 is connected by suitable electrical conduits 194 with a second "Autosyn" unit 196 the shaft 198 of which is connected with indicating hands 200, 202 and 204 traveling over a fixed dial 206 bearing pitch angle degree indicia on the face thereof. One of the hands, for example, the hand 200 may be connected with the shaft 198 in a manner to indicate the propeller pitch angle in degrees. Another hand, for example, the hand 202 may be connected with the shaft 198 through a gear train in a manner to indicate the seconds component of the pitch angle of the propeller in much the same manner that the hands of a clock indicate hours and minutes on the clock dial. The third hand 204 is connected to a gear 208 rotatable relative to the shaft 198 and is for use in manual control of the propeller pitch as will presently appear. Since the position of the shaft 88 is always exactly correlated with the pitch angle of the propeller blades, it is apparent that movements of this shaft transferred through the "Autosyn" units 186 and 196 to the hands 200 and 202 will at all times indicate the exact pitch angle of the propeller blades.

When it is desired to place the propeller pitch changing mechanism under manual control, the control knob 176 is turned in a clockwise direction to the manual control setting and the selector knob 262 is turned until the indicating hand 204 is brought to the indicated pitch angle at which it is desired to have the propeller operate incidentally bringing the disc members 238 and 246 to a corresponding angular position by the operation of the respective disc rotating gears 268 and 270 mounted on the shaft 264 which carries the knob 262. The control mechanism will now function to main the propeller pitch at the angle thus manually selected and the pitch angle may be changed at any time by rotating the knob 262 to bring the pointer 204 to a different position.

When the selector knob 176 is moved to the manual control position the control circuits are rearranged as follows. An energizing circuit for the solenoid of the valve 82 is established through the conduit 224 leading from the side 228 of the direct current source, the brush 226, the shaft 222, the contact arm 180, the contact point 216, and the electric conduit 218 leading to the valve, and from the valve through the conduit 230 to the opposite side 232 of the current source. This conduit will maintain the solenoid of the valve 82 energized at all times while the propeller is operating under manual control thereby moving the valve to block off the pressure line 80 leading from the governor outlet, thus disconnecting the governor from the pitch control mechanism, opening the line 258, which is closed during governor control of the pitch changing mechanism. An energizing circuit for the solenoid of the valve 184 is established through the conduit 224, the brush 226, the shaft 222, the arm 178, the contact point 210, the conduit 212, the brush 214, the shaft 198, the arm 254, the contact member 240 on the disc 238, the brush 236 and the conduit 234 to one side of the solenoid, the connection from the opposite side of the solenoid being through the conduit 230 to the side 232 of the direct current source as in the case of the solenoid of the valve 82. The above-described circuit for energizing the solenoid of the valve 184 is complete only when the arm 254 is on the semi-annular contact member 240 and is broken when the arm 254 is in contact with the non-conducting material of the remainder of the disc 238. The making and breaking of this circuit is effected by the "Autosyn" comprising the units 186 and 196, which rotates the shaft 198 as the propeller changes pitch and thus moves the arm 254 relative to the disc 238. When the circuit is complete the solenoid of the valve 184 is energized moving the valve to intercept the fluid conduit 322 and open the conduit 258. When the conduit 322 is intercepted fluid under pressure from the outlet of the pressure regulating valve 78 is cut off and the left hand end of the servo-motor cylinder 108 is connected through the conduit 116, the valve 84, the conduit 114, the conduit 258, the servo-motor cylinder 106 and the conduit 124 with the sump 66 thus permitting the spring 122 to move the servo-motor to change the propeller pitch in one direction. When the circuit is broken the valve 184 is in the condition illustrated in which the conduit 258 is intercepted cutting the servo-motor off from the drain and the conduit 322 is opened connecting the servo-motor cylinder 108 with the outlet of the pressure relief valve 78 through the fluid channels 256, 322, 114, and 116 and the valve 84 thus admitting fluid under pressure to the servo-motor to change the propeller pitch in the direction opposite to that incident to movement of the servo-motor by the spring 122. This operation of the valve 184 will cause the propeller pitch to change until the pitch angle of the propeller is substantially the same as that indicated by the pointer 204 but without some means for stabilizing the operation thereof, would cause the propeller pitch to continuously change within narrow limits as the arm 254 passed from one end of the contact member 240 to the adjacent end of the insulated portion of the disc 238 and back again to the contact member. The necessary stabilizing effect is provided by the operation of the valve 84. An operating circuit for the solenoid of this valve is provided through the conduit 224, the brush 226, the shaft 222, the arm 178, the contact point 210, the conduit 212, the brush 214, the shaft 198, the arm 252, the contact member 248 on the disc 246, the brush 244, and the electrical conduit 242 to one side of the solenoid and from the other side of the solenoid through the conduit 230 back to the source of direct current. The arm 252 is also moved by the "Autosyn" through rotation of the shaft 198 as the propeller changes pitch to make and break the circuit controlling the valve 84. The contact member 248 is a very narrow member in the direction circumferential of the disc 246, the circumferential extent thereof being limited by the permissible variations of the propeller pitch from the selected pitch angle. As long as the arm 252 is out of contact with the member 248 the valve 84 remains open to permit adjustment of the propeller pitch through the operation of the valve 184 is explained above. When the propeller pitch has been adjusted to an angle at which the arm 252 is on the contact member 248 the valve 84 is immediately closed to prevent any further change in the propeller pitch and will remain closed as long as the arm 252 is in contact with the member 248 thus holding the propeller at the selected pitch angle. If because of leakage or other causes the pitch angle diverges from the selected angle, the valve 84 will be opened upon a separation of the arm 252 and the contact member 248 thus permitting the operation of the valve 184 to return the propeller to the selected pitch.

While in the diagrammatic illustration in Fig. 1 two separate discs 246 and 238 have been shown rotatable by respective gear members 270 and 268 mounted on the shaft 264 which carries the selector knob 262 and a separate set of gears 208 and 266 have been shown for moving the indicating hand 204, it is to be understood that these discs and gear members may be combined into a compact unit utilizing a single disc and gear member.

By the above described means the desired pitch angle of the propeller can be manually selected and the mechanism will automatically bring the propeller pitch to the selected pitch angle and maintain it at that angle.

Figure 4:
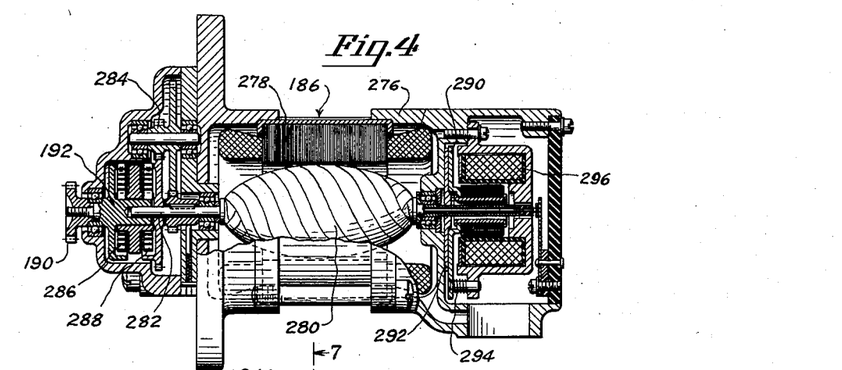
Fig. 4 is a longitudinal sectional view of one element of an "Autosyn" or position indicating device constituting another element of the improved control apparatus.
Figures 5, 6, 7:
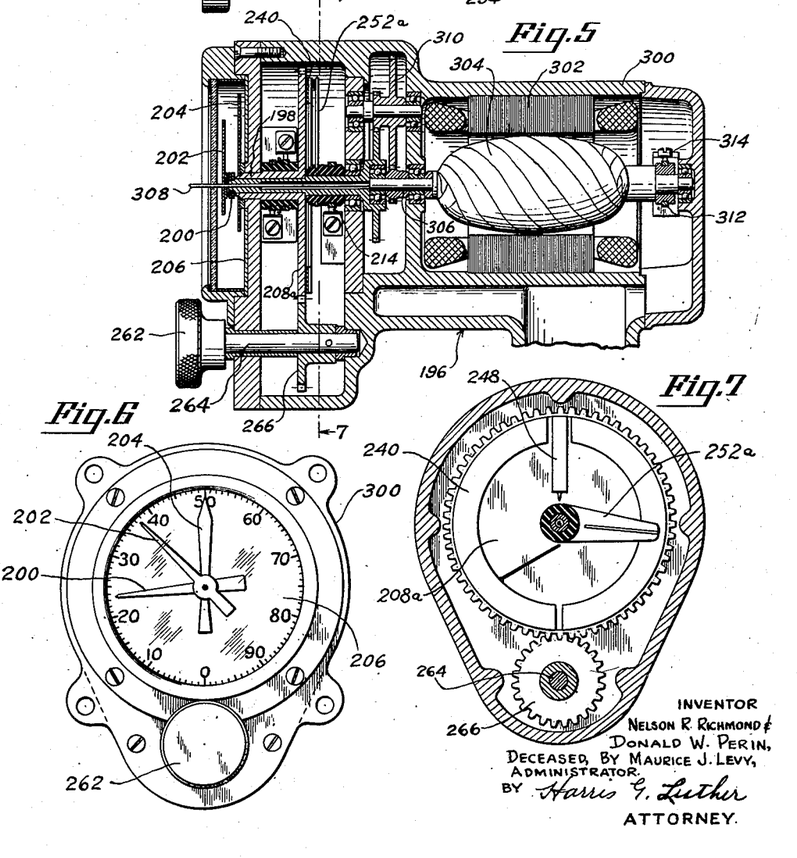
Fig. 5 is a longitudinal sectional view of another element of the "Autosyn" or position indicating device.
Fig. 6 is a front elevational view of the portion of the "Autosyn" shown in Fig. 5.
Fig. 7 is a cross-sectional view on the line 7—7 of Fig. 5 looking in the direction of the arrows.

The "Autosyn," comprising the units 186 and 196, is energized through the lines 272 and 274 from a suitable source of relatively low voltage alternating current, such as alternator, not illustrated, and this "Autosyn" together with the above-described dial and indicating pointers is particularly shown in Figs. 4, 5, and 6 to which reference may now be had for a more detailed description of this element of the apparatus.

The "Autosyn" element 186 has a casing 276 within which is mounted an electro-magnetic stator winding 278. Within this stator winding there is a rotatable armature 280 carried on a shaft 282 supported in the casing 276 on suitable anti-friction bearings. One end of this shaft 282 is connected with the shaft 192 through the step up gear train 284 and the flexible connection comprising the two oppositely wound clock springs 286 and 288, this arrangement being such that the shaft 192 is normally centered relative to the shaft 282 by the springs 286 and 288 but these two shafts may rotate relatively to each other in either direction if the resistance of the armature shaft to rotation, as for instance when it is locked in position by the clutch 290, 292, is sufficient to wind up one or the other of the springs. The opposite end of the armature shaft is connected to a clutch plate 292 which is positioned between the end of the casing 276 and a plate 290 which is held against rotation but has a limited freedom of movement axially of the shaft. This plate 290 is urged into engagement with the plate 292 by suitable springs, one of which is indicated at 294, and is moved out of engagement with the fixed plate by an electromagnet 296 which is energized when the "Autosyn" is energized. This arrangement is provided to prevent the two units 186, 196, of the "Autosyn" from getting out of step or the proper phase relation with respect to each other, as might happen if the armature of the unit 186 were rotated at a time when the two units were not electrically energized. With the above-described arrangement, if the current is cut off the clutch plate 292 will hold the armature 280 fixed and any movement of the shaft 88 rotating the gear 190 will be taken up by the springs 286 and 288 and, as the armature of the unit 196 will also remain fixed, the two units will be maintained in the proper phase relationship with respect to each other.

The unit 196 also includes a casing 300 within which is disposed a stator winding 302 and a rotatable armature 304 mounted on an armature shaft 306 supported in the casing 300 by suitable anti-friction bearings at each end thereof. One end of the shaft 306 is connected direct to the pointer 202 through the pin 308 and is connected to the pointer 200 through the reduction gear train 310 which preferably has a gear ratio the same as that of the step up gear train 284 so that movement of this pointer will be the same as the movement of the shaft 192. The opposite end of the armature shaft carries a ring 312 contacting a brush 314 through which energizing current is supplied to the "Autosyn" from the alternating current source 272. The two arms 252 and 254 are combined into a single arm 252a in the actual device illustrated in Figs. 5 and 7 and the contact members 240 and 248 are both placed on the disc 208a which takes the place of all three of the discs or annular members 208, 238 and 246 schematically shown in Fig. 1, the arrangement of the contact members being clearly shown in Fig. 7. This is possible because the two contact arms 252 and 254 are both connected with the shaft 198 and the contact members 240 and 248 are angularly spaced so that they can both be placed on the same disc without overlapping.

The construction and operation of the "Autosyn" has been only briefly described as the general theory of such devices is well known to the prior art. Alternating current supplied to the stator windings of the units 186 and 196 set up rotating magnetic fields which are in phase with each other. The magnetic field thus produced in the stator windings of one of the units induces electrical impulses in the rotor of that unit which impulses are conducted through suitable electrical connections to the rotor of the other unit. If the rotor of the first unit is moved relative to the stator of that unit it will produce in the rotor of the second unit impulses which are out of phase with the stator field of the second unit until the second unit rotor has moved a corresponding amount. This out of phase condition produces the necessary torque to keep the rotor of the second unit in step with the rotor of the first unit.

When it is desired to feather the propeller the control knob 176 is moved to the extreme clockwise position on the dial 174 bringing the arm 182 into contact with the point 316, the arm 180 into contact with the point 318 and the arm 178 into contact with the dead point 320. The contact between the arm 182 and the point 316 will energize the solenoid of the plunger 172 moving the plunger out of the way of the limit stop 168 so that the servo-motor 86 can move the distributing valve plunger 94 in a pitch increasing direction for the entire range of increasing propeller pitch. The contact of the arm 180 with the point 318 will energize the solenoid of the solenoid valve 82 cutting off the governor from the servo-motor and connecting the cylinder 108 with the pump pressure line 256 through the valve 184, the branch line 322, the valve 82, the branch line 114, the valve 84 and the fluid line 116. The pressure fluid will be applied to the piston 112 as long as the pump 64 continues to operate and likewise, fluid under pressure from the pump 30 will be applied to the pitch changing motors 16 as long as the propeller continues to rotate. As soon as the propeller reaches its feathered condition, however, its rotation will cease and the pressure in both of the above-mentioned hydraulic systems will be discontinued.

If it is desired to feather the propeller while the propeller is not rotating as for example when testing the feathering action of the propeller on the ground, the lever 176 may be moved to the feathering position and a feathering action obtained by closing the switch 324 to energize the auxiliary pump driving electric motor 326. This motor, through its gear connections 328 and 330 will rotate the pump cam member 332 which will operate the main pump 30 to supply fluid under pressure to the distributing valve 34 and through this valve to the pitch changing motor 16 and will also operate an auxiliary pump 334 which will supply hydraulic fluid under pressure to the servo-motor 86 from the line 256 in the manner above indicated. By a sufficient interval of operation of the motor 326 the propeller can be brought to its feathered condition without rotation of the engine or the propeller. It is to be noted that the gear connecion including the gears 328 and 330 which is actually an irreversible worm gear drive including an additional idler gear 335, as particularly illustrated in Fig. 2, is utilized to prevent rotation of the cam member 332 when the engine and propeller are operating and the motor 326 is de-energized. As shown in Fig. 2, rotation of cam member 332 is also prevented by cam teeth 333 projecting from cam member 332 beyond gear 330 and contacting pivoted dog 339. Operation of motor 326 rotating cam member 332 causes cam teeth 333 to come up under dog 339 moving it to the left against the force of spring 337 thus operating auxiliary pump 334.

If the propeller is in a feathered condition and it is desired to return it to the operative or constant-speed range of pitch adjustment, the pointer 204 will be moved to or left at some indicated pitch angle within the operative range and the selecting lever 176 will be moved to either the manual or constant-speed control position. The switch 324 will then be closed to energize the motor 326 and the operation of this motor will supply hydraulic fluid under pressure to the selector valve 34 and the pitch changing motors and to the servo-motor 86 in the manner indicated above. Since the propeller is above the pitch setting of the pointer 204 the solenoid of both valves 82 and 184 will be energized connecting the cylinder 108 with the sump 66 so that the spring 122 may move the servo-motor toward a lower pitch position. Assuming the position of the servo-motor has reached that corresponding to the indicated pitch angle the valve 84 will close, if the indicator knob 176 is set at the manual control position, thereby preventing any further movement of the servo-motor or, if the knob 176 is set at the constant-speed position, the solenoids of the valves 82, 184 and 84 will all be de-energized permitting the governor to come into operation to control further movements of the servo-motor.

When it is desired to reverse the pitch of the propeller, that is to bring the propeller pitch to an angle beyond the flat pitch condition, the selector knob 176 is moved in a counter-clockwise direction to the position at the end of the indicating dial 174 indicated by the designation "REV." This will bring the arm 182 into contact with the point 336, the arm 180 into contact with the point 338 and the arm 178 into contact with the point 340. Contact of the arm 182 with the point 336 will energize the solenoid of the electro-magnetically controlled plunger 172 to move this plunger out of the way of the limit stop 170 so that the propeller pitch may be changed below the constant-speed range of pitch angle adjustment. The contact of the arm 180 with the point 338 will energize the solenoid of the electro-magnetic valve 82 thereby cutting off the governor from the servo-motor 86. The contact of the arm 178 with the point 340 will energize the solenoid of the electro-magnetic valve 184 cutting off the pressure line 256 from the servo-motor and simultaneously connecting the line 116 with the sump 66 through the valve 84, the branch line 114, the branch line 258, and the conduits 260 and 124.

This set up will permit the spring 122 to move the shaft 88 to the left, as viewed in Fig. 1, to its limiting left hand position thus moving the plunger 94 of the distributor valve 34 to a limiting pitch position in which the limiting reverse pitch setting is obtained. During this operation the manual control apparatus including the knob 262 is rendered inoperative by movement of the arm 178 away from the point 210 through which the current supply to the manual control apparatus passes and energization of the electrical mechanism is accomplished.

From the above description it will be observed that there has been disclosed a control apparatus for a controllable-pitch propeller which apparatus has four selectable modes of operation by means of which propeller pitch may be automatically controlled for constant-speed operation, the propeller pitch may be manually set at any selected pitch angle, the propeller may be feathered or unfeathered and the propeller pitch may be brought to a reverse pitch angle and in which the control apparatus accurately follows up the pitch changing movements of the propeller so that propeller pitch change is always stopped at the angle indicated for proper speed correction or the angle selected by the operator which method of operation avoids any tendency of the control apparatus to overshoot or hunt in controlling the propeller pitch.

While a suitable mechanical embodiment for the purpose of disclosing the invention has been hereinabove described and illustrated in the accompanying drawings, it is to be understood that the invention is not limited to the particular embodiment so described and illustrated but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In a propeller control providing various modes of operation for a hydro-controllable propeller, in combination, a propeller, a single valve in said propeller for controlling the application of hydraulic fluid to said propeller in all of said various operative modes, a servo-motor operatively connected with said valve, hydraulic speed responsive means operatively connected with and controlling the operation of said servo-motor, and manually controlled electrical means, including a plurality of electrically actuatable fluid controlling valves, also operatively connected with said servo-motor for controlling the operation thereof.

2. In combination with a hydro-controllable propeller, a propeller-carried hydraulic system for changing the propeller pitch, a separate hydraulic system remote from said propeller for controlling said propeller-carried hydraulic system, means operatively connecting said two hydraulic systems, and an electrical system, including electrically actuatable fluid controlling valve means, remote from said propeller for controlling said hydraulic system remote from said propeller.

3. In combination with a hydro-controllable pitch propeller, a propeller-carried hydraulic system for changing the propeller pitch, a separate hydraulic system remote from said propeller for controlling said propeller-carried hydraulic system, means operatively connecting said two hydraulic systems, and an electrical system including means for visually indicating the instant pitch angle of the propeller and electrically actuatable fluid controlling valve means for controlling the hydraulic system remote from the propeller.

4. In a control for a controllable-pitch propeller, pitch changing means including a motor, means providing a constant-speed control for said pitch changing means including a servo-motor controlled by a speed responsive device and operatively connected with said pitch changing means, and manually actuatable means for disrupting the connection of said speed responsive means with said servo-motor and placing said servo-motor under manual control, said manually actuatable means including a switch and an electro-magnetic valve between said speed responsive device and said servo-motor.

5. In a control for a feathering-type controllable-pitch propeller, pitch changing means, means providing a constant-speed control for said pitch changing means within limits defined by a limit stop, and including a servo-motor controlled by a speed responsive device and operatively connected with said pitch changing means, and manually actuatable means for disrupting the connection of said speed responsive means with said servo-motor and placing said servo-motor under manual control, said manually actuatable means including a switch, an electro-magnetic valve controlled by said switch and interposed between said speed responsive device and said servo-motor, and electro-magnetic means also controlled by said switch for retracting said limit stop in order to provide for manually controlled feathering or reversing operations of the propeller.

6. In a control for a controllable-pitch propeller, pitch changing means, means providing a constant-speed control for said pitch changing means including a servo-motor controlled by a speed responsive device and operatively connected with said pitch changing means, and manually actuatable means for disrupting the connection of said speed responsive means with said servo-motor and placing said servo-motor under manual control, said manually actuatable means including electrical contact means movable in accordance with changes in propeller pitch, manually settable contact means cooperating with said movable contact means, and electro-magnetic means energized by engagement of said movable contact means with said settable contact means to discontinue operation of said pitch changing means when the propeller pitch is at an angle corresponding to a selected position of said manually settable contact means.

7. In combination with a hydro-controllable propeller, a propeller-carried hydraulic system for changing the propeller pitch, a separate hydraulic system remote from said propeller, including speed responsive mechanism and manual control means, for controlling said propeller-carried hydraulic system, means operatively connecting said two hydraulic systems, said manual control means comprising a manually-controlled electrically actuatable valve for disabling said speed-responsive means and manually-controlled electrically actuatable valve means for controlling said separate hydraulic system.

8. In a control for a controllable-pitch propeller, pitch changing means, means providing a constant-speed control for said pitch changing means including a speed responsive device, a servo-motor controlled by said speed responsive device and operatively connected with said pitch changing means, a hydraulic connection between said speed responsive device and said servo-motor, manually controlled electrically actuatable valve means for disabling said governor by blocking the connection between said speed responsive device and said servo-motor, and manually controlled electrically actuatable valve means operatively connected with said servo-motor for selectively controlling movement of said servo-motor.

9. In a control for a controllable-pitch propeller, pitch changing means, means providing a constant-speed control for said pitch changing means including a speed-responsive device, an hydraulically actuated servo-motor controlled by said speed responsive device and operatively connected with said pitch changing means, and manually actuatable means for disrupting the connection of said speed responsive means with said servo-motor and placing said servo-motor under manual control, said manually actuatable means, including electrical contact means movable in accordance with changes in propeller pitch, and manually settable contact means, including contact means cooperating with said movable contact means, electro-magnetic valve means in a connection between said servo-motor and said speed-responsive device and in a connection between said servo-motor and a source of pressure and means electrically connecting said electromagnetic valve means with said contact means for rendering said valve means operable to disrupt the connection between said speed responsive means and said servo-motor, control the operation of said servo-motor and discontinue operation of said servo-motor when the propeller pitch reaches an angle corresponding to a selected position of said manually settable contact means.

10. In a control for a controllable-pitch propeller, pitch changing means, means providing a constant speed control for said pitch changing means including a servo-motor operatively connected with said pitch changing means, a source of fluid pressure, a drain, a first means operatively connecting said source and said drain with said servo-motor, speed-responsive means, and a first valve means operatively connected with said speed-responsive means and located in said first connecting means, a second means operatively connecting said source and said drain with said servo-motor, electrical contact means movable in accordance with changes in propeller pitch, manually settable contact means, comprising contact means cooperating with said movable contact means, electro-magnetic valve means controlled by said contact means, including electro-magnetic valve means in said first connecting means for blocking said first connecting means and other electro-magnetic valve means in said second connecting means for controlling the operation of said servo-motor and for hydraulically locking said servo-motor when the propeller pitch reaches an angle corresponding to a selected position of said manually settable contact means.

11. In a propeller control providing various modes of operation of a hydro-controllable propeller including constant speed operation and feathering, in combination, a propeller, a separate hydraulic system carried by said propeller including an hydraulic pitch changing motor, a source of fluid pressure, and a single control valve for controlling the flow of fluid between said source and said motor, an hydraulic system remote from said propeller, comprising, a servo-motor operatively connected with said valve for operating the same, a source of fluid pressure for operating said servo-motor, and a series of individually operable valves for controlling the flow of fluid to and from said servo-motor, said series of valves comprising a speed governor controlled valve, and manually controlled electrically actuatable valves, manual control means for selectively energizing said electrically actuatable valves for disabling said speed governor controlled valve and selectively controlling said servo-motor to operate said single control valve and feather said propeller.

12. In a propeller control providing various modes of operation of a hydro-controllable propeller including constant speed operation and feathering, in combination, a propeller, a separate hydraulic system carried by said propeller including an hydraulic pitch changing motor, a source of fluid pressure, and a single control valve for controlling the flow of fluid between said source and said motor, an hydraulic system remote from said propeller, comprising, a servo-motor operatively connected with said valve for operating the same, top means for limiting the pitch setting of said propeller blades, a source of fluid pressure for operating said servo-motor, and a series of individually operable valves for controlling the flow of fluid to and from said servo-motor, said series of valves comprising a speed governor controlled valve, and manually controlled electrically actuatable valves, manual control means including means for disabling said stop and for selectively energizing said electrically actuated valves for disabling said speed governor controlled valve and selectively controlling said servo-motor to operate said single control valve and feather said propeller.

13. In a control for a hydro-controllable pitch propeller, a source of fluid pressure, a drain, a motor operatively connected with said propeller for changing the pitch thereof, hydraulic connections between said motor, said source, and said drain, a speed governor, a plurality of valves controlling the flow of fluid between said motor and said source and said drain, said valves comprising a control valve controlled by said speed governor and a manually controlled electrically actuatable cut off valve operable independent of the position of said control valve to render said governor ineffective to govern arranged in series in a connection between said motor and said source and said drain for controlling fluid flow between said motor and said source and said drain, a second electrically actuatable valve in a connection between said source and said motor, and a third electrically actuatable valve in a connection between said motor and said drain, and manually controlled means for selectively energizing said electrically actuatable valves to manually control said motor.

14. In a control for a hydro-controllable pitch propeller, a source of fluid pressure, a motor operatively connected with the propeller blades for changing the pitch thereof, an hydraulic connection between said source and said motor, a speed responsive valve and an electrically actuatable cut off valve arranged in series in said connection, a second hydraulic connection between said source and said motor, a second electrically actuatable valve in said second connection, and manually controlled means for selectively energizing said electrically actuatable valves.

15. In a control for a controllable-pitch propeller, pitch changing means including a motor, means providing a constant-speed control for said pitch changing means including a servo-motor controlled by a speed-responsive device and operatively connected with said motor, and manually actuatable means for disrupting the connection of said speed-responsive means with said servo-motor and placing said servo-motor under manual control, said manually actuatable means including a switch and electro-magnetic connection-disrupting means between said speed-responsive device and said servo-motor.

16. In a control for a feathering-type controllable-pitch propeller, pitch changing means, means providing a constant-speed control for said pitch changing means within limits defined by a limit stop, and including a servo-motor controlled by a speed-responsive device and operatively connected with said pitch changing means, manually actuatable means for disrupting the connection of said speed-responsive means with said servo-motor and placing said servo-motor under manual control, said manually actuatable means including a switch, electro-magnetic means controlled by said switch and interposed between said speed responsive device and said servo-motor, and electro-magnetic means also controlled by said switch for retracting said limit stop.

17. In the control for a feathering-type controllable-pitch propeller, pitch changing means, means providing a constant speed control for said pitch changing means within limits defined by a limit stop, including a hydraulic servo-motor controlled by a speed-responsive device and operatively connected with said pitch changing means, manually actuatable means for disrupting the connection of said speed-responsive means with said servo-motor and placing said servo-motor under manual control, said manually actuatable means including switch means, electro-magnetic valve means controlled by said switch means and interposed between said speed-responsive device and said servo-motor and electro-magnetic means also controlled by said switch means for retracting said limit stop.

18. In combination with a hydro-controllable pitch propeller, a control unit held against rotation with said propeller and comprising, a source of fluid under pressure, a servo-motor, a plurality of manually controlled valves and a governor including a governor valve, means for selectively actuating said manually controlled valves to selectively connect said servo-motor with said source through said governor valve for constant speed operation, or disconnect said governor from said servo-motor and manually control the connection of said source with said servo-motor, and a mechanical connection between said servo-motor and said propeller for changing the propeller pitch by movement of said servo-motor.

19. In combination with an engine and a hydro-controllable pitch propeller drivingly connected therewith, a separate control unit located between said engine and said propeller and held by said engine against rotation with said propeller and comprising a source of fluid under pressure, a servo-motor, a plurality of manually controlled valves, and a governor including a governor valve, means for selectively actuating said manually controlled valves to selectively connect said servo-motor with said source through said governor valve for constant speed operation, or disconnect said governor from said servo-motor and manually control the connection of said source with said servo-motor, and a mechanical connection between said servo-motor and said propeller for changing the propeller pitch by movement of said servo-motor.

20. In combination with a hydro-controllable propeller, a propeller-carried hydraulic system for changing the propeller pitch, a separate hydraulic system remote from said propeller for controlling said propeller hydraulic system, means operatively connecting said two hydraulic systems, a control unit held against rotation with said propeller and including said separate hydraulic system, and electrically actuatable fluid controlling valve means for controlling said remote hydraulic system.

21. In combination with an engine having a lubricating system and drivingly connected with a hydro-controllable propeller, a propeller-carried hydraulic system for changing the propeller pitch, a separate hydraulic system remote from said propeller for controlling said propeller hydraulic system, means operatively connecting said two hydraulic systems, both of said hydraulic systems being separate from the engine lubricating system, a control unit held against rotation with said propeller and including said separate hydraulic system, and electrically actuatable fluid controlling valve means for controlling said remote hydraulic system.

22. In a fluid pressure actuated variable pitch propeller having pump means operative upon rotational movement of the propeller for supplying fluid under pressure, blades, a fluid motor, and mechanism connecting said motor with said blades for moving said blades to change their pitch and position the blades in accordance with the position of said motor, a governor valve for automatically controlling the movement of said blades between predetermined high and low pitch setting by controlling the flow of fluid between said pump and said motor, the combination comprising, means providing a source of fluid under pressure when the propeller is not rotating, means negativing the governed control of blade setting, and valve means having an open and a closed position and independent of the propeller pitch, selectively manually operable upon negativing of the governed control for applying fluid from said source to said motor for actuating said motor for effecting movement of the blades to a full feathering position.

23. In a fluid pressure actuated variable pitch propeller having pump means operative upon rotational movement of the propeller for supplying fluid under pressure, blades, a fluid motor, and mechanism connecting said motor with said blades for moving said blades to change their pitch and position the blades in accordance with the position of said motor, a governor valve for automatically controlling the movement of said blades between predetermined high and low pitch setting by controlling the flow of fluid between said pump and said motor, the combination comprising, means providing a source of fluid under pressure when the propeller is not rotating, means negativing the governed control of blade setting and manually operable valve means, operable upon negativing of the governed control, for releasing fluid from said source and directing said released fluid to said motor for actuating said motor for effecting movement of the blades to a full feathering position.

24. In a control for a hydraulically-actuated controllable-pitch propeller, pitch changing means, means providing a constant speed control for said propeller including a motor controlled by a speed responsive device and operatively connected with said pitch changing means, said constant speed control comprising valve means operated by changes in propeller speeds for controlling the propeller pitch, manually actuatable means for disabling said constant speed control and manually controlling said motor, said manually actuatable means including means for manually positioning said valve means independently of said speed responsive device, means for supplying fluid under pressure while the propeller is not rotating and manually controlled valve means for controlling the application of fluid from said fluid supply to said motor.

25. In a control for a hydraulically actuated controllable pitch propeller, a governor including a governor valve, a source of hydraulic fluid under pressure energized incident to rotation of said propeller, pitch changing mechanism, a motor operatively connected with said propeller pitch changing mechanism, said governor valve being connected by fluid conduits with said source and said motor to change propeller pitch in response to changes in speed, a second source of fluid under pressure available when the propeller is not rotating, a manual control for said propeller, said manual control including means disabling control by said governor, and means, including manually actuatable valve means, selectively making said second source of fluid available for pitch changing operation and directing fluid from said second source to said motor.

26. In a control for a hydraulically actuated controllable pitch propeller, a governor including a governor valve, a source of hydraulic fluid under pressure energized incident to rotation of said propeller, pitch changing mechanism, a motor operatively connected with said propeller pitch changing mechanism, said governor valve being connected by fluid conduits with said source and said motor to change propeller pitch in response to changes in speed, a second source of fluid under pressure available when the propeller is not rotating, a manual control for said propeller, said manual control including means disabling control by said governor, a manually actuatable valve between said second source and said motor, manually actuated means for operating said manually actuatable valve including means for opening said manually actuatable valve, and means directing fluid from said second source through said open manually actuatable valve to said motor to feather the propeller.

27. In a control for a hydraulically actuated controllable pitch propeller, a governor including a governor valve, a source of hydraulic fluid under pressure energized incident to rotation of said propeller, pitch changing mechanism, a motor operatively connected with said propeller pitch changing mechanism, said governor valve being connected by fluid conduits with said source and said motor to change propeller pitch in response to changes in speed, a second source of fluid under pressure available when the propeller is not rotating, a manual control for said propeller, said manual control including means disabling control by said governor, a manually actuatable valve between said second source and said motor, manually actuated means for operating said valve including means for opening said valve, means directing fluid from said second source through said open valve to said motor to feather the propeller, means operatively connecting said disabling means and said manually actuated valve operating means, and a single manually controlled actuating means for both said disabling means and said valve operating means.

NELSON R. RICHMOND.
MAURICE J. LEVY,
*Administrator of estate of Donald W. Perin, deceased.*

References Cited in the file of this patent

UNITED STATES PATENTS

| Number | Name | Date |
|---|---|---|
| Re. 22,034 | Hoover | Feb. 24, 1942 |
| 719,283 | Weber | Jan. 27, 1903 |
| 1,106,434 | Woodward | Aug. 11, 1914 |
| 1,147,820 | Scott | July 27, 1915 |
| 1,291,566 | Lewis | Jan. 14, 1919 |
| 1,375,269 | Akemann | Apr. 19, 1921 |
| 1,465,723 | West | Aug. 21, 1923 |
| 1,695,159 | Burch | June 26, 1928 |
| 1,990,814 | Castro | Feb. 12, 1935 |
| 2,017,086 | Zouck | Oct. 15, 1935 |
| 2,023,785 | Hoover | Dec. 10, 1935 |
| 2,030,986 | Havill | Feb. 18, 1936 |
| 2,128,983 | Blanchard | Sept. 6, 1938 |
| 2,145,850 | Caldwell | Feb. 7, 1939 |
| 2,146,401 | Manchester | Feb. 7, 1939 |
| 2,163,663 | Caldwell | June 27, 1939 |
| 2,192,790 | Havill | Mar. 5, 1940 |
| 2,221,365 | Ware | Nov. 12, 1940 |
| 2,229,058 | Dicks | Jan. 21, 1941 |
| 2,232,838 | Bryant | Feb. 25, 1941 |
| 2,243,095 | Hammond | May 27, 1941 |
| 2,279,301 | Colley et al. | Apr. 14, 1942 |
| 2,280,713 | Martin et al. | Apr. 21, 1942 |
| 2,307,102 | Blanchard et al. | Jan. 5, 1943 |

FOREIGN PATENTS

| Number | Country | Date |
|---|---|---|
| 299,254 | Italy | July 26, 1932 |
| 476,852 | Great Britain | Dec. 16, 1937 |
| 499,634 | Great Britain | Jan. 26, 1939 |
| 517,696 | Great Britain | Feb. 6, 1940 |